(12) United States Patent
Gaudron et al.

(10) Patent No.: US 8,376,679 B2
(45) Date of Patent: Feb. 19, 2013

(54) WALL ANCHOR SYSTEM

(75) Inventors: Paul Gaudron, Stratford, CT (US); Alan J. Armiento, New Rochelle, NY (US)

(73) Assignee: Black & Decker Inc., Newark, DE (US)

( * ) Notice: Subject to any disclaimer, the term of this patent is extended or adjusted under 35 U.S.C. 154(b) by 373 days.

(21) Appl. No.: 12/696,102

(22) Filed: Jan. 29, 2010

(65) Prior Publication Data
US 2011/0188963 A1  Aug. 4, 2011

(51) Int. Cl.
*F16B 23/00* (2006.01)

(52) U.S. Cl. .......................................... 411/400; 411/509

(58) Field of Classification Search .................. 411/400, 411/508, 509, 45; 24/297
See application file for complete search history.

(56) References Cited

U.S. PATENT DOCUMENTS

| | | | | |
|---|---|---|---|---|
| 2,571,641 A * | 10/1951 | Wing | ............................ | 411/141 |
| 4,012,155 A * | 3/1977 | Morris | ........................... | 403/290 |
| 5,625,994 A | 5/1997 | Giannuzzi | | |
| 6,126,356 A * | 10/2000 | Russell | ........................... | 403/24 |
| 6,280,116 B1 * | 8/2001 | Szu | .............................. | 403/408.1 |
| 6,412,163 B1 * | 7/2002 | Russell | ............................ | 29/453 |
| 6,530,629 B2 * | 3/2003 | Shyr | .......................... | 312/223.2 |
| 6,769,849 B2 * | 8/2004 | Yoneoka | .......................... | 411/45 |
| 6,955,515 B2 * | 10/2005 | Barina et al. | .................. | 411/508 |
| 7,001,124 B2 * | 2/2006 | Panasik et al. | .................. | 411/30 |
| 7,011,132 B2 * | 3/2006 | Robbins, III | .................. | 160/332 |
| 7,261,505 B2 | 8/2007 | Ernst et al. | | |
| 7,850,408 B2 * | 12/2010 | Ernst et al. | .................... | 411/344 |

* cited by examiner

*Primary Examiner* — Gary Estremsky
(74) *Attorney, Agent, or Firm* — Cantor Colburn LLP

(57) ABSTRACT

A wall anchor system includes an anchor member installable into a hollow wall. The anchor member includes a body having a first end that extends to a second end through an intermediate portion. The body includes an internal passage having a fastener retaining feature provided adjacent the first end. A fastener member is operatively engageable with the anchor member.

16 Claims, 4 Drawing Sheets

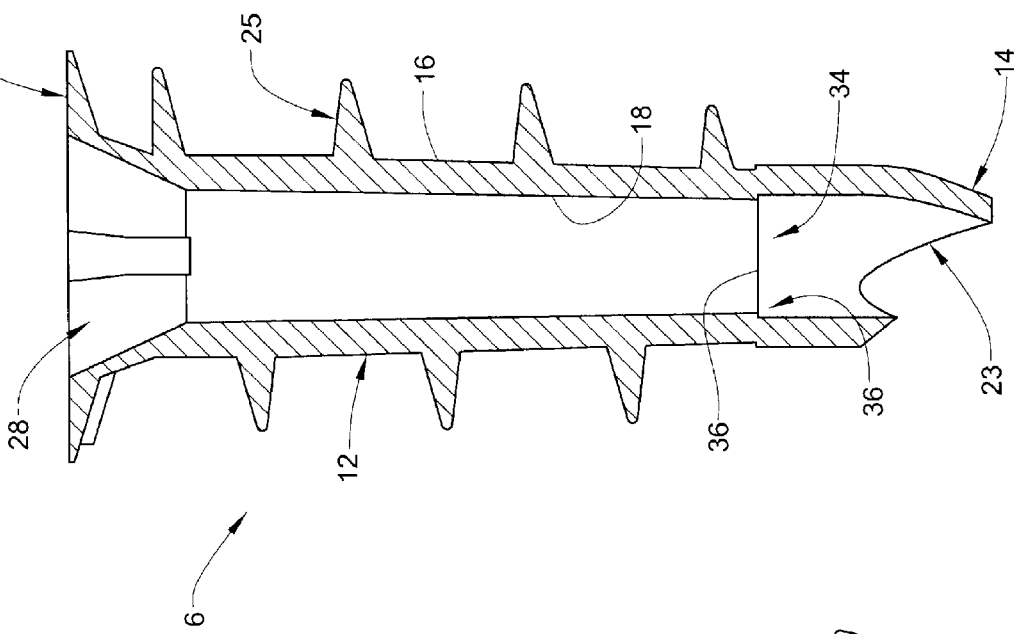
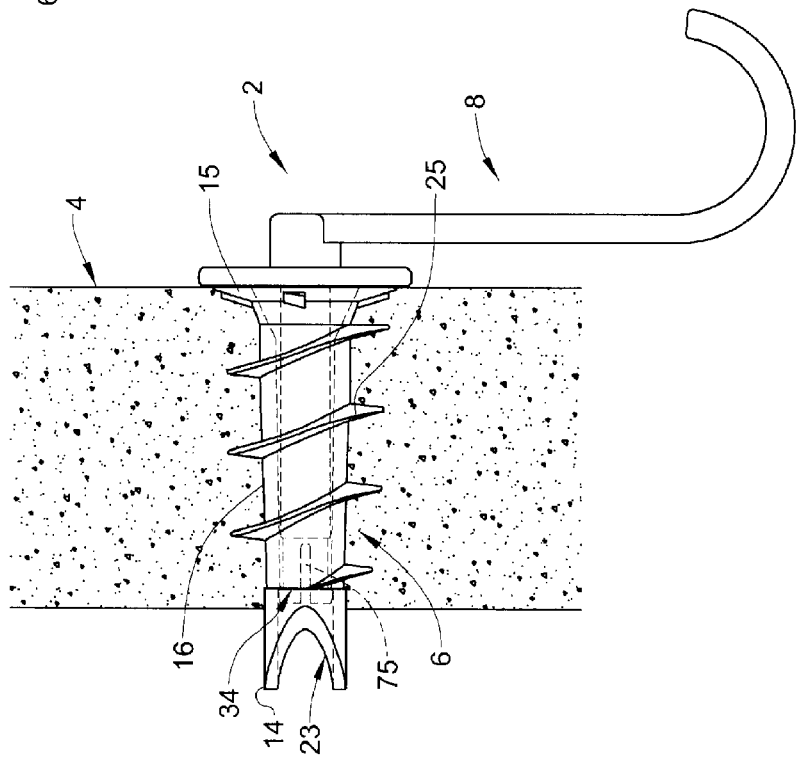

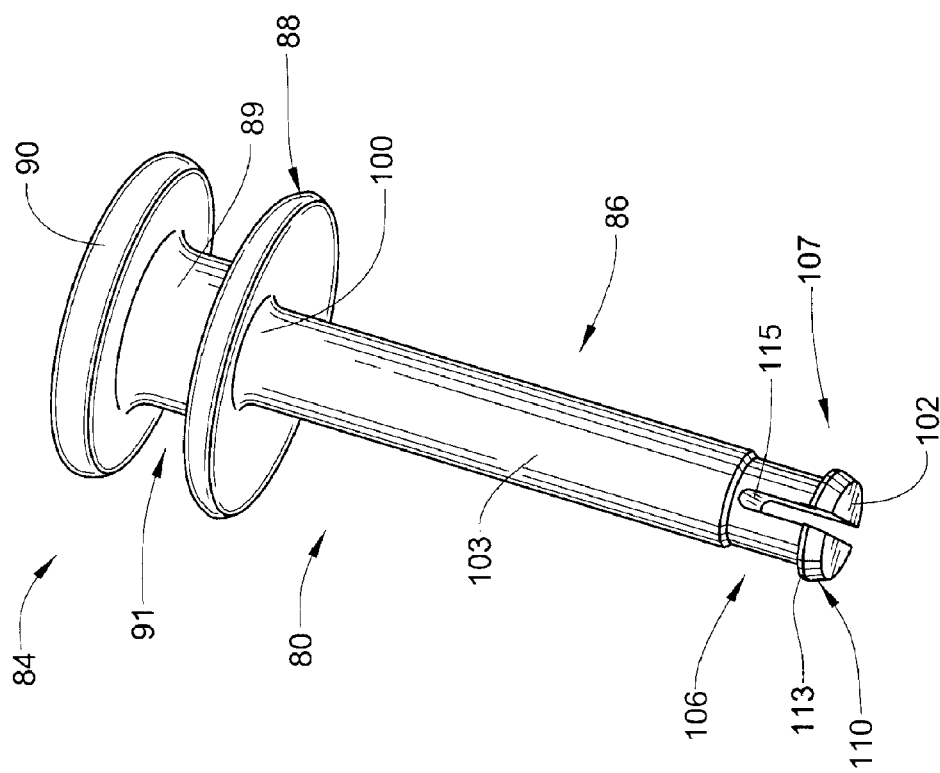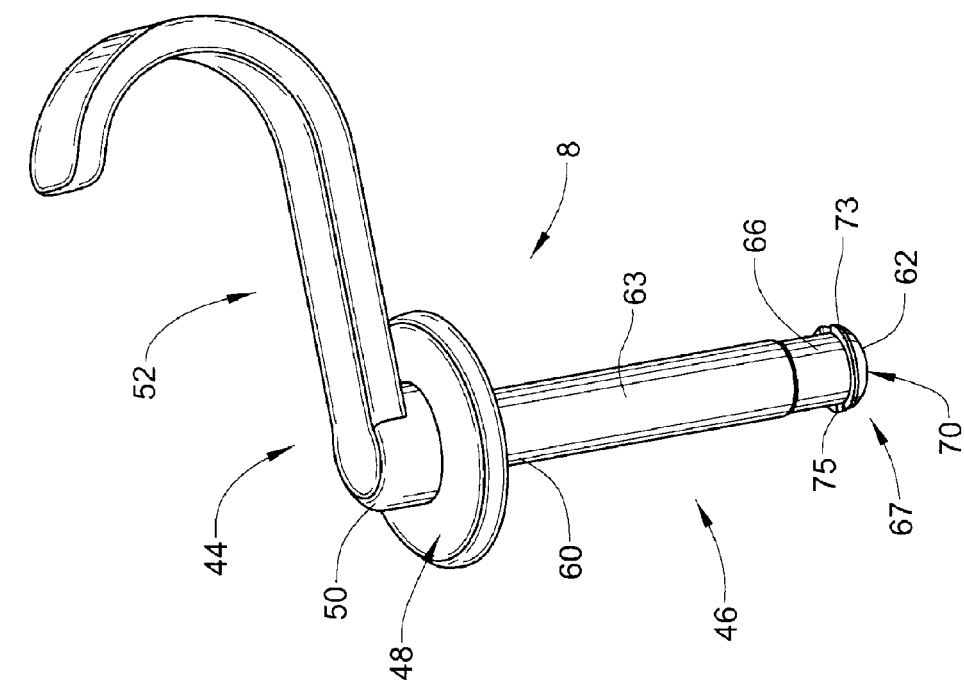

WALL ANCHOR SYSTEM

BACKGROUND

The subject matter disclosed herein relates to the art of wall anchors and, more particularly, to a wall anchor system for suspending objects or structures from a wall.

In the past, supporting or hanging an object from a wall required multiple tools and operations. First a hole is drilled in the wall, next an anchor is installed into the hole, and a fastener is inserted into the anchor. When forming the hole in a wall constructed from dry wall, fiberboard and the like, size is important. More specifically, if the diameter of the hole is too large, the anchor will spin when trying to insert the fastener. Conversely, if the hole is too small, the anchor will require excessive effort to insert. Often times the effort results in making the hole too large and, as noted above, the fastener will be difficult to properly insert.

More recently, manufactures have introduced self-drilling anchors that are screwed into the wall. More specifically, self-drilling anchors include a first end having a cutting tip that extends to a second end through an intermediate portion. The intermediate portion includes a plurality of coarse external threads configured to pass into, for example, dry wall. The second end is configured to receive a screw driver and, ultimately, a threaded fastener. With this arrangement, the self-drilling anchor is initially screwed into the wall with a screw driver. The cutting tip combined with the external thread, provides a resilient, non-slipping, interface between the self-drilling anchor and the wall. Once installed, a threaded fastener is installed into the anchor. In this manner, the same tool used to install the self-drilling anchor, can be used to insert the fastener. Occasionally, installing the fastener requires a force that can cause the anchor to undesirably continue to thread deeper into the wall.

SUMMARY

A wall anchor system includes an anchor member installable into a wall. The anchor member includes a body having a first end that extends to a second end through an intermediate portion. The body includes an internal passage having a fastener retaining feature provided adjacent the first end. A fastener member is operatively engageable with the anchor member.

A method of facilitating suspending an object on a wall includes installing an anchor into the wall. The anchor includes an internal passage having a fastener retaining feature. A support portion of a fastener member is inserted into the internal passage. The support portion includes an anchor engagement member. The anchor engagement member is operatively engaged with the fastener retaining feature.

BRIEF DESCRIPTION OF THE DRAWINGS

Referring now to the drawings wherein like elements are numbered alike in the Figures:

FIG. 1 is a plan view of an anchor system including an anchor member and a fastener member in accordance with an exemplary embodiment;

FIG. 2 is a plan view of the anchor member of FIG. 1;

FIG. 3 is a perspective view of the fastener member of FIG. 1;

FIG. 4 is a perspective view of a fastener member in accordance with another aspect of the exemplary embodiment;

DETAILED DESCRIPTION

Figure 5:
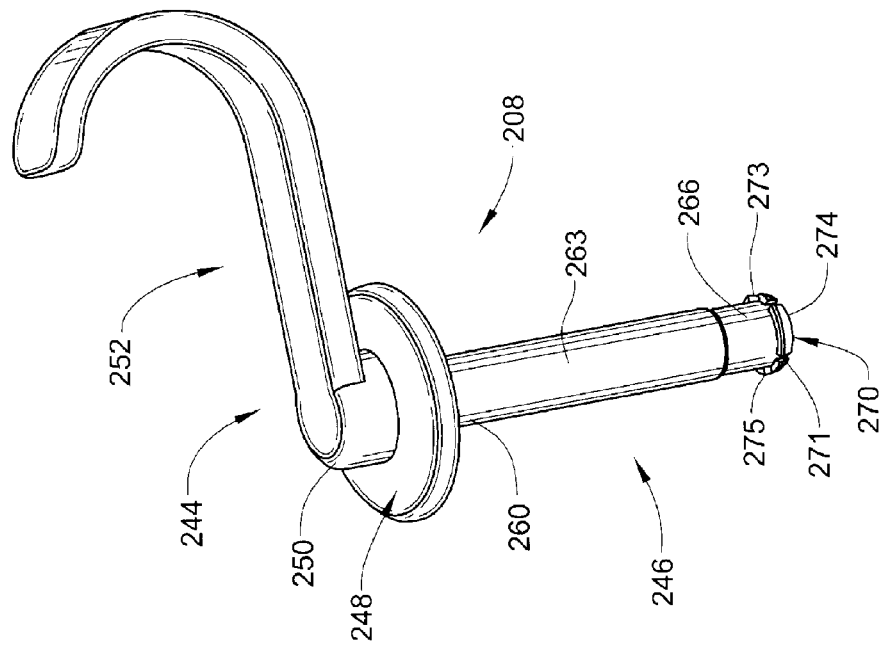
FIG. 5 is a plan view of an anchor member in accordance with another aspect of the exemplary embodiment.

Referring to FIG. 1, a wall anchor system constructed in accordance with an exemplary embodiment is indicated generally at 2. Anchor system 2 is configured to support/suspend objects from a wall 4 such as dry wall, gypsum board, and the like. Of course, it should be understood that anchor system 2 can also be employed in connection with solid walls. Anchor system 2 includes an anchor member 6 configured to be inserted into wall 4 and a fastener member 8 that is received by anchor member 6. As best shown in FIG. 2, anchor member 6 includes a body 12 having a first end 14 that extends to a second end 15 through an intermediate portion 16 that defines an internal passage 18. In the exemplary embodiment shown, first end 14 is provided with a cutting feature 23 that facilitates insertion into wall 4. In order to further facilitate insertion, and ensure a robust attachment, intermediate portion 16 is provided with a plurality of threads 25. Second end 15 is provided with an opening 28 that enables a user to employ a tool, such as, for example, a screw driver, to insert anchor member 6 into wall 4. Opening 28 also provides structure for receiving fastener member 8 as will be detailed more fully below. In order to enhance engagement with fastener member 8, anchor member 6 includes a fastener retaining feature 34. In the exemplary embodiment shown, fastener retaining feature 34 includes a step portion 36 that provides a snap-fit engagement with fastener member 8 as will also be detailed more fully below.

Referring to FIG. 3, fastener member 8 includes a hook portion 44 operatively connected to a support or pin portion 46. Hook portion 44 includes a protrusion, shown in the form of a disc member 48 that supports a post element 50. Post element 50, in turn, supports a hook 52 shown in the form of a J-hook. Pin portion 46 extends from disc member 48 and includes a first end portion 60 that leads to a second end portion 62 though an intermediate portion 63. In the exemplary embodiment shown, second end portion 62 includes a reduced diameter section 66 that defines, at least in part, an anchor engagement member 67. Of course, various elements and geometries can be utilized to define anchor engagement member 67. In the exemplary embodiment shown, anchor engagement member 67 takes the form of a collar portion 70 having an orthogonal surface 73. Collar portion 70 includes a slot 75 that extends longitudinally into pin portion 46. With this arrangement, once anchor member 6 is installed into wall 4, pin portion 46 is inserted into opening 28 and moved toward second end 15. Slot 75 enables collar portion 70 to resiliently compress and travel towards fastener retaining feature 34. At this point it should be understood that while shown as a slot, pin portion 46 could include other structure that facilitates a resilient deflection of collar 70. Once past step portion 36, collar portion 70 expands and snap-fittingly engages with fastener retaining feature 34. Once engaged, orthogonal surface 73 prevents the removal of fastener member 8.

Referring to FIG. 4, a fastener member constructed in accordance with another aspect of the exemplary embodiment is indicated generally at 80. Fastener member 80 includes a hook portion 84 operatively connected to a support or pin portion 86. Hook portion 84 includes a first protrusion, shown in the form of a disc member 88, that supports a post element 89. Post element 89 in turn, supports a second protrusion, shown in the form of a disc member 90, thereby defining a shoulder zone 91. Shoulder zone 91 is employed, for example, to receive a wire and support/suspend a picture (not shown) from wall 4. Pin portion 86 extends from first disc member 88 and includes a first end portion 100 that leads to a second end portion 102 through an intermediate portion 103. Second end portion 102 includes a reduced diameter section 106 that defines, at least in part, an anchor engagement member 107. Of course, various other elements and geometries can be utilized to define anchor engagement member 107. In the exemplary embodiment shown, anchor engagement member 107 takes the form of a collar portion 110 having, instead of an orthogonal surface, a back angle section 113. By back angle section, it should be understood that collar portion 110 includes a chamfered or angled rear surface. The angled rear surface facilitates the resilient deflection of collar portion 110 enabling the withdrawal of fastener member 80 from anchor member 6. In a manner similar to that described above, collar portion 110 includes a slot 115 that extends longitudinally into pin portion 86. Once anchor member 6 is installed into wall 4, pin portion 86 is inserted into opening 28 and moved toward second end 15. Slot 115 enables collar portion 110 to resiliently compress and travel towards fastener retaining feature 34. At this point it should be understood that while shown as a slot, pin portion 86 could include other structure that facilitates a resilient deflection of collar portion 110. Once past step portion 36, collar portion 110 expands and snap-fittingly engages with fastener retaining feature 34. To remove, a reverse force is applied causing back angle section 113 to traverse step portion 36 allowing fastener member 80 to be withdrawn from internal passage 18.

Figure 6:
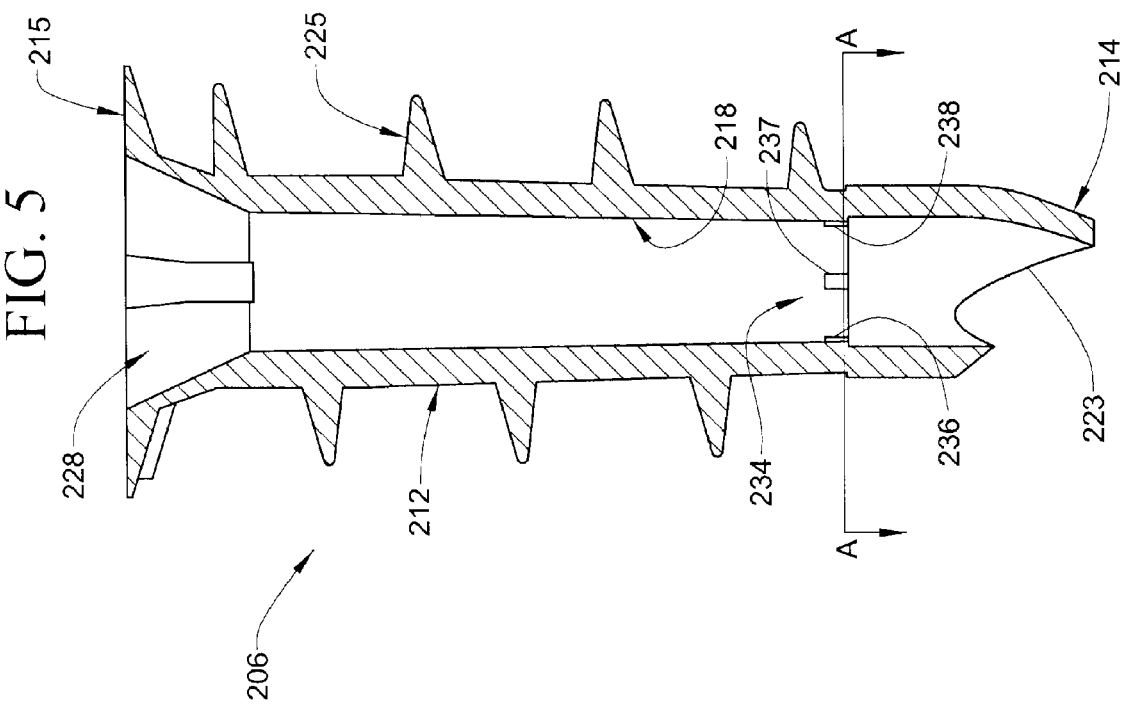
FIG. 6; is a perspective view of a fastener member in accordance with yet another aspect of the exemplary embodiment

Referring to FIGS. 5-6, an anchor system constructed in accordance with another exemplary embodiment includes an anchor member 206 and a fastener member 208. Anchor member 206 includes a body 212 having a first end 214 that extends to a second end 215 through an intermediate portion 216 that defines an internal passage 218. In the exemplary embodiment shown, first end 214 is provided with a cutting feature 223 that facilitates insertion into wall 4. In order to further facilitate insertion, and ensure a robust attachment, intermediate portion 216 is provided with a plurality of threads 225. Second end 215 is provided with an opening 228 that enables a user to employ a tool, such as a screw driver to insert anchor member 206 into wall 4. Opening 228 also provides structure for receiving fastener member 208 as will be detailed more fully below. In order to enhance engagement with fastener member 208, anchor member 206 includes a fastener retaining feature 234. In the exemplary embodiment shown, fastener retaining feature 234 includes a plurality of raised sections 236-239 (See also FIG. 8) that project outward from an internal surface (not separately labeled) of internal passage 218. Raised sections 236-239 provide a twist-lock engagement with fastener member 208 as will also be detailed more fully below.

Figure 8:
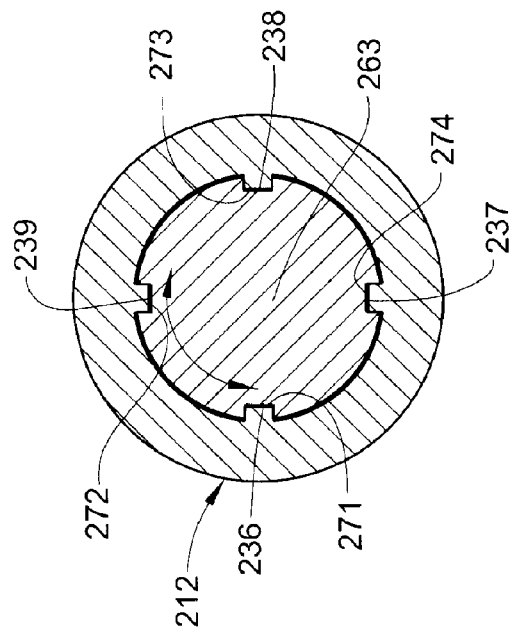
FIG. 8 is a cross-sectional view of the anchor member of FIG. 5 taken through the line A-A.

Fastener member 208 includes a hook portion 244 operatively connected to a support or pin portion 246. Hook portion 244 includes a protrusion, shown in the form of a disc member 248, that supports a post element 250. Post element 250 in turn, supports a hook 252 shown in the form of a J-hook. Pin portion 246 extends from disc member 248 and includes a first end portion 260 that leads to a second end portion 262 though an intermediate portion 263. In the exemplary embodiment shown, second end portion 262 includes a reduced diameter section 266 that defines, at least in part, an anchor engagement member 267. Anchor engagement member 267 takes the form of a collar portion 270 having an orthogonal surface 273. Collar portion 270 includes a plurality of recessed element 271-274 that correspond to raised sections 236-239 on anchor member 206. With this arrangement, once anchor member 206 is installed into wall 4, pin portion 246 is inserted into opening 228 and moved toward second end 215. Recessed elements 271-274 register with raised sections 236-239 allowing collar portion 270 to pass toward second end 215. At this point, fastener member 208 is rotated, such as shown in FIG. 8, to operatively engage with anchor member 206. To remove, fastener member 208 is rotated to align recessed elements 271-274 with raised sections 236-239. Once aligned, fastener member 208 can be withdrawn from internal passage 218.

Figure 7:
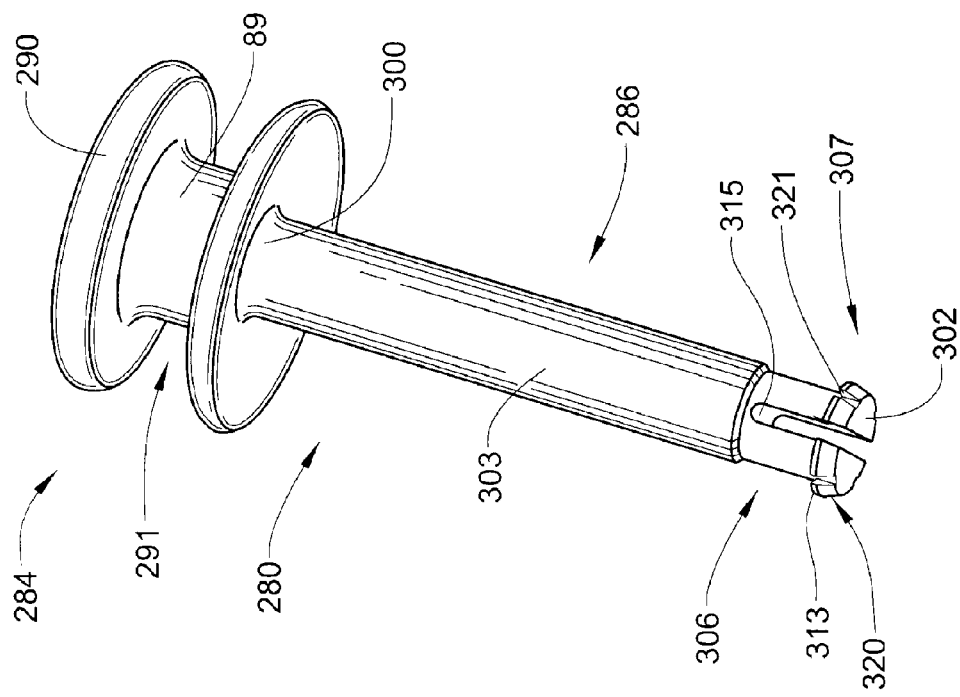
FIG. 7 is a perspective view of a fastener member in accordance with still another aspect of the exemplary embodiment.

Referring to FIG. 7, a fastener member constructed in accordance with yet another aspect of the exemplary embodiment is indicated generally at 280. Fastener member 280 includes a hook portion 284 operatively connected to a support or pin portion 286. Hook portion 284 includes a first protrusion, shown in the form of a disc member 288, that supports a post element 289. Post element 289 in turn, supports a second protrusion, shown in the form of a disc member 290, thereby defining a shoulder zone 291. In a manner similar to that described above, shoulder zone 291 is employed, for example, to receive a wire and support/suspend a picture (not shown) from wall 4. Pin portion 286 extends from first disc member 288 and includes a first end portion 300 that leads to a second end portion 302 though an intermediate portion 303. In the exemplary embodiment shown, second end portion 302 includes a reduced diameter section 306 that defines, at least in part, an anchor engagement member 307. Anchor engagement member 307 takes the form of a collar portion 310 having an orthogonal surface 313 Collar portion 310 includes a slot 315 that extends longitudinally into pin portion 286 and a plurality or recessed sections, two of which are indicated at 320 and 321. In a manner similar to that described above, once anchor member 206 is installed into wall 4, pin portion 286 is inserted into opening 28 and moved toward second end 215. Recessed elements 320-321 register with corresponding ones of raised sections 236-239 allowing collar portion 307 to pass toward second end 215. At this point, fastener member 280 is rotated, such as shown in FIG. 8, to operatively engage with anchor member 206. To remove, fastener member 280 is rotated to align recessed elements 320-321 with raised sections 236-239. Once aligned, fastener member 208 can be withdrawn from internal passage 218. The above-described embodiments provide an anchor system that allows a user to employ a wide range of fastener members, swap, and exchange fastener members as needed, and insert a fastener member without applying additional toque to the anchor member.

At this point it should be understood that while shown in connection with a self-drilling anchor, the fastener members in accordance with the exemplary embodiments could also be employed in a standard wall anchor used in both solid and hollow walls. In addition, while each fastener member is shown to include a reduced diameter portion, other geometries can also be employed to at least partially define the anchor engagement member. Also, while exemplary embodiments show a slot to provide resilient defection of the collar portion, other mechanisms can also be employed.

Finally it is to be understood while one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A wall anchor system comprising:
   an anchor member installable into a wall, the anchor member including a body having a first end that extends to a second end, through an intermediate portion, the body including a plurality of external threads an internal passage having a fastener retaining feature provided adjacent the first end; and
   a fastener member including a support portion configured to be received by the internal passage, the support portion including an anchor engagement member that is configured and disposed to operatively connect with the fastener retaining feature, wherein the fastener retaining feature includes a step portion and the anchor engagement member includes a collar portion projecting radially outward from the support portion, the collar portion being configured to snap-fittingly engage with the step portion to secure the fastener member relative to the anchor member.

2. The wall anchor system according to claim 1, wherein the anchor engagement member includes a back angle section that facilitates withdrawal of the fastener member from the anchor member.

3. The wall anchor system according to claim 1, wherein the fastener retaining feature includes a slot that extends along a longitudinal axis into the support portion, the slot facilitating compression of the collar portion when inserted into the internal passage.

4. The wall anchor system according to claim 1, further comprising:
   a plurality of recessed elements provided in one of the fastener retaining feature and the anchor engagement member; and
   a plurality of raised sections formed on the other of the fastener retaining feature and the anchor engagement member, the plurality of raised sections being configured and disposed to selectively register with the plurality of recessed element providing a twist-lock engagement between the fastener member and the anchor member.

5. The wall anchor system according to claim 1, wherein the fastener member includes a hook portion in the form of a J-hook.

6. The wall anchor system according to claim 1, wherein the fastener member includes a hook portion including a first projection operatively coupled to a second projection, the second projection being spaced from the first projection thereby defining a shoulder portion.

7. A wall anchor system comprising:
   an anchor member installable into a wall, the anchor member including a body having a first end that extends to a second end, through an intermediate portion, the body including a plurality of external threads an internal passage having a fastener retaining feature provided adjacent the first end; and
   a fastener member including a support portion configured to be received by the internal passage, the support portion including an anchor engagement member that is configured and disposed to operatively connect with the fastener retaining feature, wherein the fastener member includes a hook portion in the form of a J-hook.

8. The wall anchor system according to claim 7, wherein the anchor engagement member includes a back angle section that facilitates withdrawal of the fastener member from the anchor member.

9. The wall anchor system according to claim 7, wherein the fastener retaining feature includes a step portion and the anchor engagement member includes a collar portion projecting radially outward from the support portion, the collar portion being configured to snap-fittingly engage with the step portion to secure the fastener member relative to the anchor member.

10. The wall anchor system according to claim 9, wherein the fastener retaining feature includes a slot that extends along a longitudinal axis into the support portion, the slot facilitating compression of the collar portion when inserted into the internal passage.

11. The wall anchor system according to claim 7, further comprising:
    a plurality of recessed elements provided in one of the fastener retaining feature and the anchor engagement member; and
    a plurality of raised sections formed on the other of the fastener retaining feature and the anchor engagement member, the plurality of raised sections being configured and disposed to selectively register with the plurality of recessed element providing a twist-lock engagement between the fastener member and the anchor member.

12. A wall anchor system comprising:
    an anchor member installable into a wall, the anchor member including a body having a first end that extends to a second end, through an intermediate portion, the body including a plurality of external threads an internal passage having a fastener retaining feature provided adjacent the first end; and
    a fastener member including a support portion configured to be received by the internal passage, the support portion including an anchor engagement member that is configured and disposed to operatively connect with the fastener retaining feature, wherein the fastener member includes a hook portion including a first projection operatively coupled to a second projection, the second projection being spaced from the first projection thereby defining a shoulder portion.

13. The fastener retaining member according to claim 12, wherein the anchor engagement member includes a back angle section that facilitates withdrawal of the fastener member from the anchor member.

14. The wall anchor system according to claim 12, wherein the fastener retaining feature includes a step portion and the anchor engagement member includes a collar portion projecting radially outward from the support portion, the collar portion being configured to snap-fittingly engage with the step portion to secure the fastener member relative to the anchor member.

15. The wall anchor system according to claim 14, wherein the fastener retaining feature includes a slot that extends along a longitudinal axis into the support portion, the slot facilitating compression of the collar portion when inserted into the internal passage.

16. The wall anchor system according to claim 12, further comprising:
    a plurality of recessed elements provided in one of the fastener retaining feature and the anchor engagement member; and
    a plurality of raised sections formed on the other of the fastener retaining feature and the anchor engagement member, the plurality of raised sections being configured and disposed to selectively register with the plurality of recessed element providing a twist-lock engagement between the fastener member and the anchor member.

* * * * *